US005175464A

United States Patent [19]

Smith

[11] Patent Number: 5,175,464

[45] Date of Patent: Dec. 29, 1992

[54] APPARATUS FOR FEEDING A FLUID MEDIUM ACTING AS AN ELECTROLYTE, ESPECIALLY A FUEL

[75] Inventor: Loren Smith, Canton, Mich.

[73] Assignee: Robert Bosch GmbH, Stuttgart, Fed. Rep. of Germany

[21] Appl. No.: 789,699

[22] Filed: Nov. 8, 1991

[30] Foreign Application Priority Data

Dec. 14, 1990 [DE] Fed. Rep. of Germany ....... 4040002

[51] Int. Cl.[5] .......................................... H02K 13/00

[52] U.S. Cl. .................................... 310/239; 310/42; 310/87; 310/242; 310/246; 417/423.7

[58] Field of Search .................. 310/239.42, 241, 233, 310/242, 248, 243.89, 244, 246, 45, 87; 417/366, 423.3, 423.7

[56] References Cited

U.S. PATENT DOCUMENTS

| | | | |
|---|---|---|---|
| 1,277,394 | 9/1918 | Dean | 310/244 |
| 1,802,957 | 4/1931 | Ragsdale | 310/244 |
| 3,234,420 | 2/1966 | Linder | 310/244 |
| 3,936,243 | 2/1976 | Gakenholz | 417/423.3 |
| 4,157,483 | 6/1979 | Frimley | 310/242 |
| 4,586,877 | 5/1986 | Watanabe | 417/366 |
| 4,774,430 | 9/1988 | Rodriguez | 310/239 |
| 4,843,272 | 6/1989 | Mabuchi | 310/239 |
| 4,983,872 | 1/1991 | Strobl | 310/239 |
| 5,015,895 | 5/1991 | Wong | 310/239 |
| 5,070,269 | 12/1991 | Tamaki | 310/239 |

FOREIGN PATENT DOCUMENTS

| | | |
|---|---|---|
| 3016086 | 11/1980 | Fed. Rep. of Germany . |
| 2047980 | 4/1980 | United Kingdom . |

*Primary Examiner*—R. Skudy
*Attorney, Agent, or Firm*—Michael J. Striker

[57] ABSTRACT

The apparatus for feeding an electrolyte fluid medium includes a housing and, mounted in the housing, an electric drive motor and a pump driven by it. The electric drive motor has a commutator device connectable electrically to a conductor supplying current to it. The commutator device includes a commutator attached to the armature spindle of the drive motor, at least two contacting brushes engaged with contacting surfaces of the commutator and prestressed spring devices for holding the brushes against the commutator. To meet the operating requirements and combat the erosion, the prestressed spring devices are leaf springs (42,44). One end (46) of each leaf spring is held fast against the housing and the other end (72) supports one of the contacting brushes (38,40). Each contacting brush (38,40) has a protruding portion (50) engaging in a throughgoing opening (52) of a leaf spring (42,44). The regions of the leaf springs contacting by the flowing fluid medium during operation including an electrical connecting point (64) to a conductor (30) supplying current and also transition regions between the leaf springs and the contacting brushes are coated with a coating material resistant to the electrolyte fluid medium during operation.

6 Claims, 2 Drawing Sheets

APPARATUS FOR FEEDING A FLUID MEDIUM ACTING AS AN ELECTROLYTE, ESPECIALLY A FUEL

BACKGROUND OF THE INVENTION

The present invention relates to an apparatus for feeding a fluid medium and, more particularly, to an apparatus for feeding a fluid medium acting as an electrolyte, especially a fuel.

An apparatus of this kind for feeding a fluid medium is known comprising a housing having an inlet opening and an outlet opening for the fluid medium, an electric drive motor located in the housing and having an armature spindle, and a pump also mounted in the housing in working connection with the drive motor. The electric drive motor has a commutator device connectable electrically to an electric circuit. The commutator device comprises a commutator having contacting surfaces mounted on the armature spindle of the electric drive motor, at least two contacting brushes engaged with the contacting surfaces of the commutator and prestressed spring means associated with each of the contacting brushes, each of the contacting brushes being held against the contacting surfaces by action of the prestressed spring means.

So that the known device (as described in German Published Patent Application 30 16 086) can be used for feeding of a fluid medium acting as an electrolyte, the individual wires of the copper conductor cable leading from the electrical connection points to the carbon brushes located in a case- or box-like guide are surrounded by a protective coating of nickel, tin, silver or aluminum. This is because in the alcohol fuel under consideration for use, which is more powerful in comparison to current fuels and which contains for example 15% methanol (M 15), the electrical conductivity is in the Micro-Siemens-Region ($\mu$S). This is based on the fact that methanol has an affinity for water. In pure methanol (M 100) or ethanol (E 100) fuel the electrical conductivity increases because of its susceptibility to oxidation and the formation of acetic acid (in E 100) and formic acid (in M 100). In the Micro-Siemens-Region of the electrical conductivity these fluids already act as electrolytes, so that because of the potential differences in the motor deposits occur, especially on the bare wires on the anode side which are exposed to fluid medium flow.

With the usually used fuel, whose conductivity is in the Pico-Siemens-Region (pS), these considerations play no part in the design of the fuel feed apparatus. The features of the feed apparatus known from the above mentioned state of the art for prevention of electroerosion stiffen the brush wires so much that the usual well made contact of the commutator brush to the contacting surface of the commutator is no longer guaranteed with the usual brush spring means formed as a compressed coil spring. A corresponding stiffening of the spring however increases the wear on the carbon brushes and decreases the efficiency of the electric drive motor and also the feed apparatus. Additional basic problems are described in the German Published Patent Application 30 16 086.

SUMMARY OF THE INVENTION

It is an object of the present invention to provide an apparatus for feeding a fluid medium acting as an electrolyte, which avoids the above-described disadvantages.

This object, and others which will be made more apparent hereinafter, is attained in an apparatus for feeding a fluid medium acting as an electrolyte, especially a fuel, including a housing having an inlet opening and an outlet opening for the fluid medium, an electric drive motor located in the housing and having an armature spindle, and a pump also mounted in the housing in working connection with the drive motor, the electric drive motor having a commutator device connectable electrically to a conductor of an electric circuit supplying current, the commutator device comprising a commutator having contacting surfaces mounted on the armature spindle of the electric drive motor, at least two contacting brushes engaged with the contacting surfaces of the commutator and prestressed spring means associated with each of the contacting brushes. Each of the contacting brushes are held against the contacting surfaces of the commutator by action of the prestressed spring means.

According to the invention, the prestressed spring means comprises a leaf spring having one end held fast against the housing and another end supporting one of the contacting brushes. Each of the contacting brushes has a protruding portion and each of the leaf springs has a throughgoing opening in which the protruding portion engages. The leaf springs have contacting regions contacted by flowing fluid medium during operation including an electrical connecting point of the leaf spring to a conductor supplying current and also transition regions between the leaf springs and the contacting brushes and the transition regions. The contacting regions and the electrical connecting point are coated with a coating material resistant to the fluid medium.

The apparatus for feeding a fluid medium according to the invention with the above described structure has the advantage that it has comparatively flat surfaces on portions contacting the fluid medium, which guide the flow, which are easily protected and which are easily built into the apparatus.

Various embodiments of the invention can be provided. For example, each of the contacting brushes can be soldered into the throughgoing opening in the leaf spring. The leaf spring can be made of synthetic carbon and all portions of the contacting brushes contacting the leaf springs can be provided with a solderable layer. The solderable layer can have two layer portions, of which a first layer portion provided on portions of the contacting brushes is made of copper and a second layer portion is applied to the first layer portion and is advantageously of tin.

In a preferred embodiment of the invention at least a region of the leaf spring coming into contact with the contacting brush is provided with a coating of solderable material, which is advantageously tin.

Advantageously the material coating the transistion regions, the connecting point and the contacting regions of the leaf springs is chosen so that the action of the leaf springs is not substantially impaired by the material.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
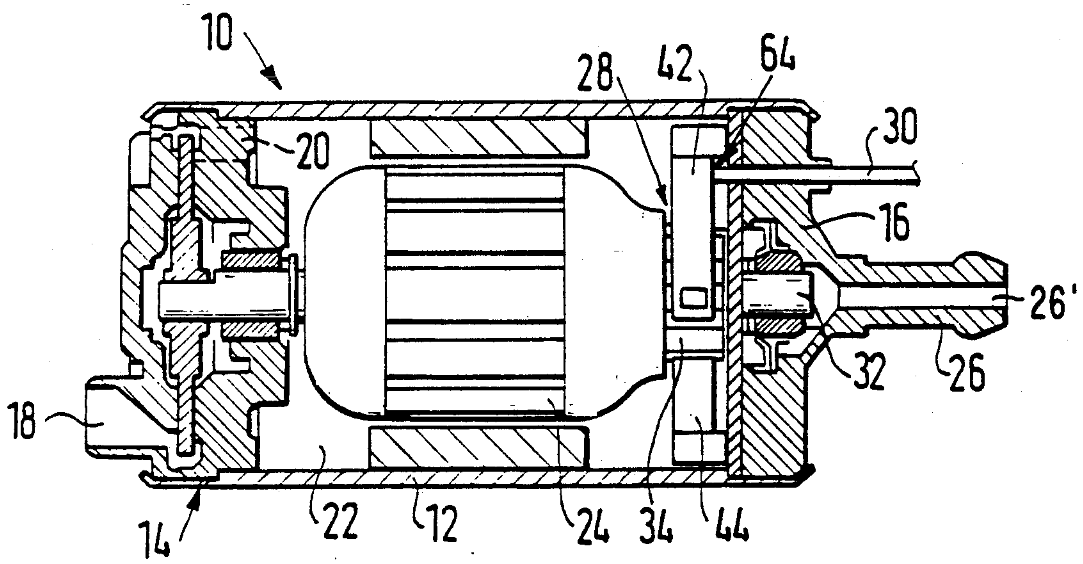
FIG. 1 is a longitudinal cross-sectional view through a fuel feeding apparatus according to the invention, which includes an electrical drive motor as well as a feed pump.
Figure 2:
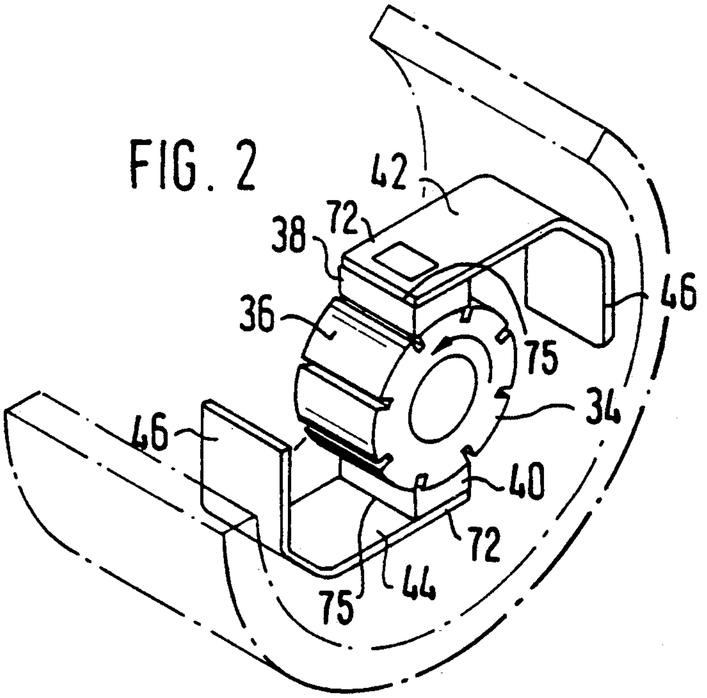
FIG. 2 is a detailed perspective view of a commutator device, which is part of the electrical drive motor of the apparatus according to the invention.

An apparatus 10 according to the invention for feeding fuel from an unshown tank to an internal combustion engine shown in FIG. 1 has a pipe-shaped housing 12, whose one open end is closed by a pump 14 and whose other open end is closed by a cover 16. The pump 14 has an inlet opening 18, through which the fluid medium required arrives in the pump 14. The fluid medium is forced from the pump through a pressure orifice 20 into a chamber 22 of the housing 12. An electrical drive motor 24 is located in the chamber 22. The electrical drive motor 24 drives the pump 14. From the chamber 22 the fluid medium is discharged from a connector pipe 26 having the outlet opening 26' into an unshown feed or delivery pipe. As FIG. 1 shows, the electrical drive motor 24 has a commutator device 28, which is shown separately in FIG. 2. A white conductor 30, which is part of a working electric circuit of the electric motor 24, passes through the cover 16 of the housing to the commutator device 28. As shown in FIGS. 1 and 2, the electrical drive motor 24 has an armature spindle 32 and the so-called drum commutator 34 mounted on the armature spindle 32. The drum commutator 3 has contacting surfaces 36 and contacts two diametrically opposed contacting brushes 38 and 40, which are engaged with the contacting surfaces 36. The contacting brushes 38 and 40 are attached at the free ends 72 of the leaf springs 42 and 44 respectively. The other end 46 of each leaf spring 42 and/or 44 is attached with the housing 12, of the feeding apparatus 10. The leaf springs 42 and/or 44 are prestressed against the contacting surfaces of the drum commutator 34 in the operating position of the carbon contacting brushes 38,40 shown in FIG. 2, so that they contact the contacting surfaces 36 as prescribed. In FIG. 2 the carbon brushes 38,40 are attached to their leaf springs 42,44. Prior to assembly in the feeding apparatus 10 a coating material is applied to the leaf springs 42,44, which is described hereinafter.

Thus a so-called hammer brush mounting results, which is particularly simple in structure.

Figure 3:
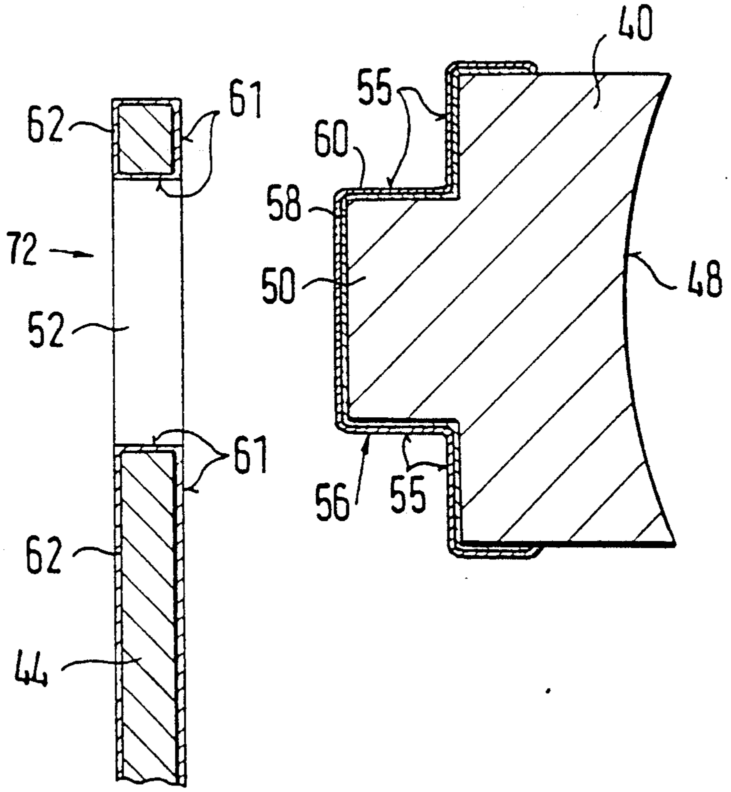
FIG. 3 is a detailed partial cross-sectional view of the commutator device of FIG. 2 showing the contacting brush and the leaf spring separated from each other.
Figure 4:
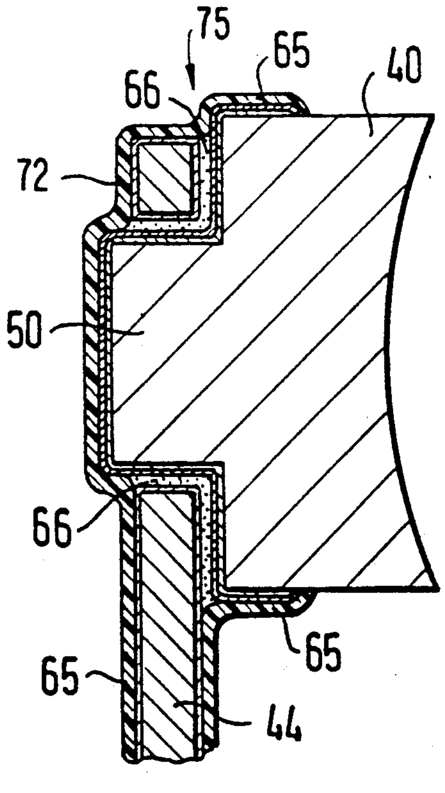
FIG. 4 is a detailed partial cross-sectional view of the commutator device of FIG. 2 showing the contacting brush and the leaf spring engaged with each other.

The leaf spring 44 and the contacting brush 40 (FIG. 2) of the hammer brush mounting are shown in more detail in FIGS. 3 and 4. As shown in FIGS. 2 and 3, the contacting brush 40 has a protruding portion 50 on its side facing away or opposite from the pressing surface 48 of the brush 40, which engages on the contacting surfaces 36 of the collector or drum commutator 34. A round opening 52 through the leaf spring 42 in the vicinity of the free end 72 of the leaf spring 42 is dimensioned and shaped to receive the protruding portion 50. As FIG. 4 shows the contacting brush 40 is soldered in the opening 52 of the leaf spring 44. So that the contacting brush 40 is solderable, a solderable layer 56 is provided on all portions 55 of the contacting brush 40 contacting the leaf spring 44. This solderable layer 56 is made from two layer portions 58, 60, of which the first layer portion 58 is made from copper. The second layer portion 60 is applied to this copper layer portion 58 and is made advantageously from tin. Furthermore the portions 61 of the leaf spring 44 coming into contact with the leaf spring 40 are also coated with a solderable material, advantageously a coating 62 made of tin. This coating 62 can also however completely cover the leaf spring. So that during the operation of the feeding apparatus—when the fluid medium is fed according to the way described at the outset—the regions of the electric motor contacting the flowing medium are not destroyed, the entire leaf spring 44, the electrical connection point 64 of a conductor 30 to the leaf spring springs 42,44 and the transition regions 75 between the carbon brush 40 and the leaf spring 44 and/or the transition region 75 of the layer 56 on the carbon brush 40 are provided with a coating 65, which is made of an easily deformable coating material, advantageously of plastic, so that the action of the leaf spring 42 is not substantially impaired. This coating 65 prevents the direct contact of the fed fluid medium with the flow-guiding parts. The coating itself is made of a coating material, which is resistant to the fuel.

Both layer portions 58, 60 are arranged so that the copper layer 58 is applied to the carbon brush, while the second layer portion 60 covers the copper layer 58. In this way it is guaranteed that a particularly strong solder joint is attained. In FIG. 4 the solder material is provided with reference number 66. Also a good current flow between the commutator 34 and the connection point 64 is guaranteed. Because of this the leaf springs 42,44 can be made from a bronze alloy for example.

While the invention has been illustrated and described as embodied in an apparatus for feeding a fluid medium as an electrolyte, especially a fuel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. In an apparatus for feeding a fluid medium acting as an electrolyte, especially a fuel, comprising a housing having an inlet opening and an outlet opening for the fluid medium, an electric drive motor located in the housing and having an armature spindle, and a pump mounted in the housing in working connection with the electric drive motor, said electric drive motor having a commutator device, said commutator device including a commutator having contacting surfaces mounted on the armature spindle of the electric drive motor, at least two contacting brushes engaged with said contacting surfaces of the commutator and prestressed spring means associated with each of said contacting brushes, each of said contacting brushes being urged against said contacting surfaces by action of the prestressed spring means, the improvement wherein said prestressed spring means comprises a leaf spring (42,44) made of synthetic carbon and having two ends, one end (46) of which is held fast against the housing and another end (72) of which carries one of the contacting brushes (38,40), each of said contacting brushes (38,40) has a protruding portion (50) and each of said leaf springs (42,44) has a throughgoing opening (52) in which the protruding portion (50) engages, and wherein the leaf springs (42,44) have regions contacted by the fluid medium flowing during operation including an electrical connecting point (64) of the leaf springs to a conductor (30) supplying current to the leaf springs and also transition regions (75) between the leaf springs and the contacting brushes and said transition regions, said regions of said leaf springs contacted by said fluid medium and said connecting point (64) are coated with a coating material resistant to the fluid medium, and each of the contacting brushes (38,40) is soldered into the throughgoing opening (52) in the leaf spring (42,44), and the contacting brushes (38,40) have portions (55) contacting the leaf springs (42,44) when the contacting brushes (38,40) are soldered in the throughgoing openings (52) and the portions (55) are provided with a solderable layer (56) having first and second layer portions (58,60) and the first layer portion (58) covers the portions (55) of the contacting brushes (38,40) and consists essentially of copper, and the second layer portion (60) is applied to the first layer portion (58).

2. The improvement as defined in claim 1, wherein the second layer portion (60) is made from tin.

3. The improvement as defined in claim 1, wherein at least one portion of the leaf spring (42,44) coming into contact with the contacting brush (38,40) is provided with a coating of solderable material.

4. The improvement as defined in claim 3, wherein said solderable material consists essentially of tin.

5. The improvement as defined in claim 1, wherein the coating material coating the transition regions, the electrical connecting point (64) and the regions of the leaf springs contacting the fluid medium is chosen so that action of the leaf springs is not substantially impaired by the coating material.

6. The improvement as defined in claim 1, wherein the leaf springs (42,44) are made of bronze alloy.

* * * * *